United States Patent
Belenkov et al.

(10) Patent No.: US 8,210,555 B2
(45) Date of Patent: Jul. 3, 2012

(54) FOLDING RECUMBENT VEHICLE

(76) Inventors: Alexandre Belenkov, Toronto (CA);
Eugene Belenkov, Toronto (CA)

( * ) Notice: Subject to any disclaimer, the term of this patent is extended or adjusted under 35 U.S.C. 154(b) by 248 days.

(21) Appl. No.: 12/733,671

(22) PCT Filed: Jan. 12, 2009

(86) PCT No.: PCT/CA2009/000086
§ 371 (c)(1),
(2), (4) Date: Mar. 15, 2010

(87) PCT Pub. No.: WO2009/094758
PCT Pub. Date: Aug. 6, 2009

(65) Prior Publication Data
US 2010/0237582 A1    Sep. 23, 2010

(30) Foreign Application Priority Data
Jan. 28, 2008 (CA) .................... 2628222

(51) Int. Cl.
*B62K 5/00* (2006.01)
(52) U.S. Cl. ...... 280/287; 280/282; 280/278; 280/288.1
(58) Field of Classification Search ............... 280/282, 280/287, 278, 288.1
See application file for complete search history.

(56) References Cited

U.S. PATENT DOCUMENTS

| | | | |
|---|---|---|---|
| 4,408,776 A * | 10/1983 | Randolph et al. | 280/261 |
| 4,432,561 A | 2/1984 | Feikema | |
| 4,456,277 A * | 6/1984 | Carpenter | 280/282 |
| 4,548,421 A | 10/1985 | Weiner | |
| 4,674,762 A | 6/1987 | Nelson | |
| 4,767,130 A | 8/1988 | Fu-Chao | |
| 4,903,857 A | 2/1990 | Klopfenstain | |
| 4,998,596 A | 3/1991 | Miksitz | |
| 5,069,469 A | 12/1991 | Rosengrant | |
| 5,145,196 A | 9/1992 | Langkamp | |
| 5,263,732 A | 11/1993 | Harmeyer | |
| 5,342,074 A | 8/1994 | Amdahl | |
| 5,354,084 A | 10/1994 | Lofgren | |
| 5,544,906 A | 8/1996 | Clapper | |
| 5,568,935 A | 10/1996 | Mason | |
| 5,762,350 A * | 6/1998 | Jolly | 280/245 |
| 5,762,351 A | 6/1998 | SooHoo | |
| 6,193,253 B1 * | 2/2001 | Barnett | 280/234 |
| 6,203,043 B1 | 3/2001 | Lehman | |
| 6,402,174 B1 | 6/2002 | Maurer | |
| 6,659,488 B1 | 12/2003 | Beresnitzky | |
| 6,742,797 B2 * | 6/2004 | Lopez | 280/287 |
| 6,932,370 B2 | 8/2005 | Jones | |
| 6,953,203 B2 * | 10/2005 | Wilcox et al. | 280/282 |
| 6,988,741 B2 * | 1/2006 | Borochov et al. | 280/282 |

* cited by examiner

*Primary Examiner* — Lesley D. Morris
*Assistant Examiner* — Michael Stabley (57) ABSTRACT

The vehicle has a single steered front wheel (1) mounted on a main frame (5) and two rear wheels (2, 3) mounted on a left (6) and right (7) frames. The left and right frames are connected to the main frame pivotally, which permits the vehicle to be folded into a compact position. The folded vehicle can stand up-right and can be moved to a storage place on two rear (2, 3) and two caster (145) wheels. For carrying inside a car the cycle also can be disassembled to four parts. The seat (9) has a two-point spring suspension with the axis higher than the center of gravity of the seated driver. It allows the seat with the driver to stay in a vertical position while driving on a lateral slope or to lean right and left as the vehicle is making a turn. The vehicle has a leg-operated back pedaling brake mechanism (15) and a car-style steering mechanism with a high-ratio cable reducer (12).

17 Claims, 12 Drawing Sheets

FOLDING RECUMBENT VEHICLE

TECHNICAL FIELD

The invention relates generally to recumbent human powered vehicles.

BACKGROUND ART

Three- and four-wheeled human powered recumbent cycles are well known. They have many advantages over traditional bicycles, such as a more comfortable position for the driver, more stability and safety on the road, greater pedaling force and some others. But at the same time, this type of vehicles has a few disadvantages.

The first disadvantage relates to their large size. Like a personal vehicle, recumbent cycles are usually used for short periods, the rest of the time the vehicle must be stored some place. In the house it can be a garage or shed, but it is very difficult to store such a vehicle in a residential building. To transport this vehicle by a car is also difficult. U.S. Pat. No. 5,544,906 discloses a three-wheel cycle stored in an upright position and U.S. Pat. No.5,145,196 describes a collapsible tricycle; but most existing patents for recumbent cycles do not mention anything about the storage and carriage problems. It would be advantageous to provide a vehicle, which can be folded and disassembled as well.

Compared to standard bicycles, driving a three- or four-wheeled cycle on a road is uncomfortable because roads usually slope away from the middle towards the side and the seat is not straight. Also, on turning, the centrifugal force tends to shift the rider's body to the side, which requires an extra effort from the driver to keep the balance. To solve these problems, some patents disclose a vehicle with some type of leaning system. For example, the cycle disclosed in U.S. Pat. No. 6,402,174B1 has a leaning seat and all leaning wheels while the vehicles disclosed in U.S. Pat. Nos. 4,432,561 and 5,568,935 have a leaning seat and just one leaning wheel. In all of these cycles the leaning is controlled by the effort of hands, which requires the driver's constant attention and which increases the strain on the driver's hands and arms. For comfortable riding it would be advantageous to provide the recumbent vehicle with a more simple and automatic leaning system, which does not require any effort by the driver.

Additionally, most recumbent cycles are uncomfortable when driving off-road. Unlike conventional bicycles, recumbent cycles do not permit the driver to lift up above the seat while driving over a rough terrain. The driver of a recumbent cycle is therefore exposed to severe vertical and side-to-side shocks. To compensate, some recumbent designs have incorporated suspension systems, such as those vehicles disclosed in U.S. Pat. Nos. 4,548,421 and 6,203,043B1. But the suspensions disclosed in these references are quite complicated. It would be advantageous to provide a recumbent vehicle with a simple suspension system.

Most of the recumbent vehicles have a bicycle-type hand-operated braking system with brake levers on the handlebars. However, braking a three- or four-wheeled cycle has some special concerns. First of all, multi-wheeled cycles are more massive and require greater braking power. Secondly, for a safe deceleration the braking force should be applied simultaneously and equally both left and right wheels. It is difficult to do with two separate hand brake levers. Using the power of only one hand for stopping two wheels can be insufficient for a strong and reliable braking of the vehicle. Disk or drum brakes are more efficient, but they are more complicated and expensive, and they create an extra load to the wheel's rim and spokes. Additionally, in order to be ready for emergency braking, the driver has to grip the handlebars at all times. It is not convenient driving when both hands are always busy. It would be advantageous to provide a recumbent cycle with leg-operated, back pedaling brakes with ordinary calipers.

The steering mechanism of the majority of the recumbent vehicles has a bicycle-type front or lowered handlebars, for example U.S. Pat. Nos. 4,432,561, 5,145,196, 5,263,732, 5,544,906, 5,568,935, 6,203,043B1 and 6,402,174B1. A common disadvantage of these cycles is the low ratio of the steering mechanism, usually about 1, i.e. the angle of turning of the bar is approximately equal to the relevant angle of turning of the steered wheel. It provides overly sensitive control of the vehicle and requires continuous attention by the driver, especially at a high speed. Also, compared to a bicycle, driving recumbent tricycle is affected by forces intending to turn the vehicle right or left. Those forces appear, for example, when the vehicle drives on a lateral slope, when road obstacles decelerate only one of the side wheels, or when the braking of side wheels is not synchronous. These forces create a turning torque to the steered wheel (or wheels), which is transmitted without any reduction (due to low ratio) to the handlebars. This requires an additional effort by the driver to hold the bars to keep the desired direction. For easy and comfortable driving it would be advantageous to provide a recumbent vehicle with a car-style steering mechanism with a high-ratio reducer.

DISCLOSURE OF INVENTION

The objective of the invention is an improved folding recumbent three-wheel human-powered cycle, which is comfortable to ride and compact for storage and transportation.

In accordance with one aspect of the invention, the three-wheel recumbent cycle can be folded to a compact position for storage. For this purpose it has a frame comprised of three pivotally connected parts, a removable and folding seat, a lowering steering shaft, a disconnectable pedal mechanism and braking cables. Folding a cycle reduces its size in all three dimensions (length, width and height). Folded and raised in a vertical position, the vehicle can be moved to a storage place on two rear and two caster wheels. Its width does not exceed the size of a standard door frame; this means the vehicle can be moved into a locker room or out onto a balcony. For carrying inside a car, the recumbent cycle can also be disassembled without any tools to four relatively compact parts.

As another aspect of the invention, the recumbent cycle has a free-suspended seat, supported in two middle points: one—on the front of the seat, another—on the back. The front support of the seat has a spherical joint; the top-back part of the seat is hung from a cross-element of the frame by means of buffer springs. In the meantime, the axis connecting the front joint and the bottom point of the springs is higher than the center of mass of the seated driver. Thus, the force of gravity keeps the seat with the driver in a vertical position when the vehicle drives on a lateral slope. During the turns the centrifugal force makes the seat lean towards one side or the other, while keeping the balanced position of the driver. The swinging spring suspension of the seat not only increases the comfort of the rider, but also diminishes the peak loads to the wheels and frame of the vehicle in poor driving conditions. For greater comfort the seat has a few adjustments. For folding the vehicle, the seat should be taken out from the frame, folded and hung from the bottom cross-tube of the standing upright vehicle.

In accordance with the next aspect of the invention to provide strong, fast, and reliable braking, the recumbent cycle has a leg-operated brake system with ordinary calipers. The pedal mechanism has a separate chain drive to the braking drum, which engages only on reverse rotation of the pedals. Attached to the drum, cables pull and squeeze the calipers of the rear wheels. Before folding, the ends of the cables can be disconnected from the calipers.

In accordance with another aspect of the invention, the steering mechanism of the cycle has an automobile-style steering wheel, cable reducer and front fork assembly. A high ratio (about 8) reducer provides easy and precise steering of the vehicle at any speed and in any road condition. The position of the steering wheel can be adjusted according to the size of a driver. For mounting and dismounting, the steering wheel shifts to a forward position; for folding—backward and down.

Yet another aspect of the invention, the recumbent cycle has a two-stage chain pedal mechanism with an intermediate shaft between stages. It transmits the pedaling force from the pedal-crank to the left rear wheel. The parts of the first stage of the mechanism are mounted on the main frame; second stage, on the left frame. The intermediate shaft has a fork flex coupling, which can be disengaged before folding the vehicle.

The given recumbent cycle does not have complicated parts and is based on the components of conventional bicycles, including wheels. It provides a relatively simple and inexpensive manufacturing process, easy maintenance and parts replacement.

BEST MODES FOR CARRYING OUT THE INVENTION

FIGS. 1 through 21 illustrate the preferred embodiment of the invention.

Figure 1:
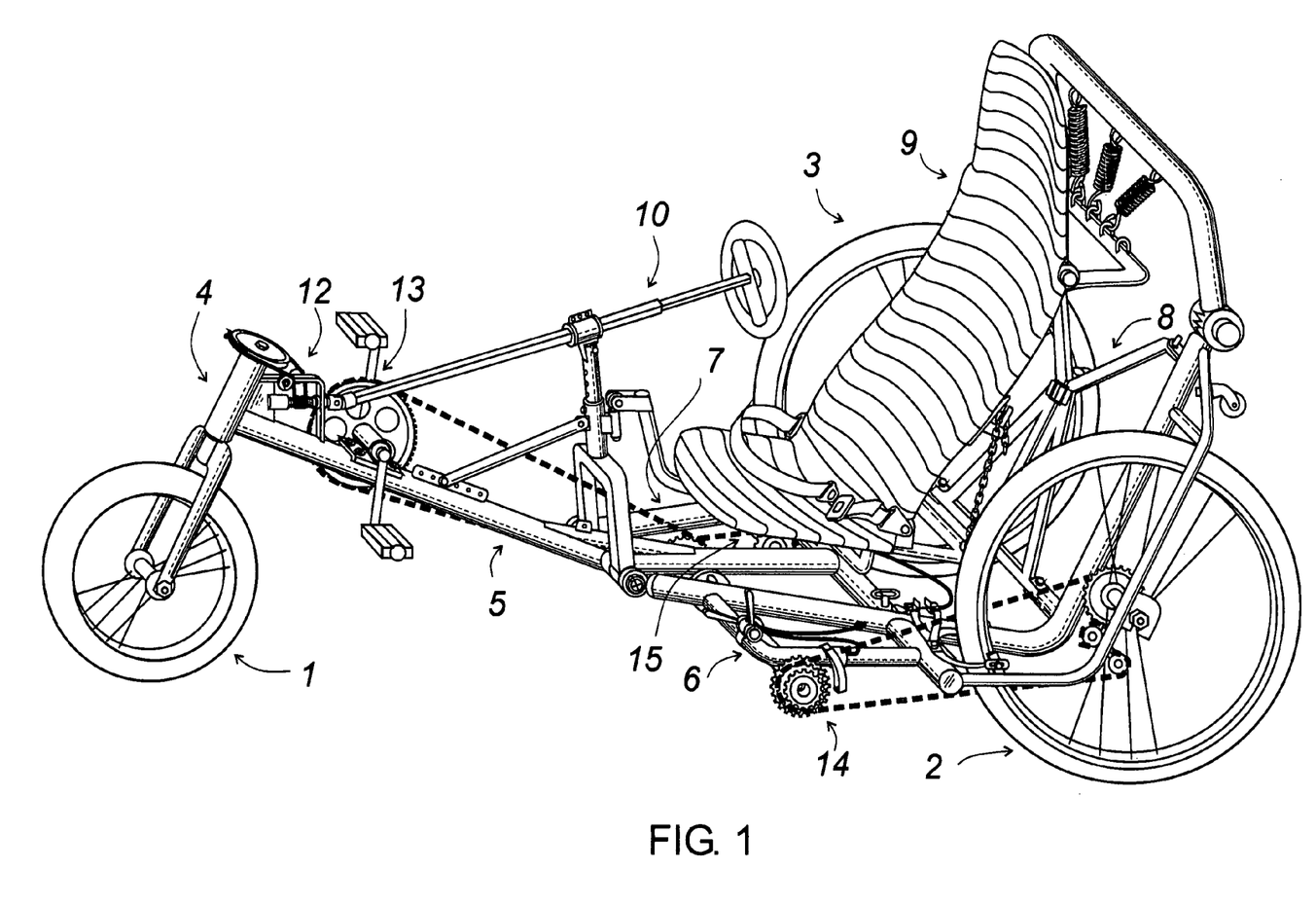
FIG. 1 is an isometric view of a vehicle made in accordance with the present invention.

As shown in FIG. 1, the vehicle consists of:
1. Front wheel assembly.
2. Left wheel assembly.
3. Right wheel assembly.
4. Front fork assembly.
5. Main frame element assembly.
6. Left frame element assembly.
7. Right frame element assembly.
8. Folding brace assembly.
9. Seat assembly.
10. Steering shaft assembly.
12. Cable reducer.
13. Pedal crank assembly.
14. Intermediate shaft assembly.
15. Braking mechanism assembly.

Figure 2:
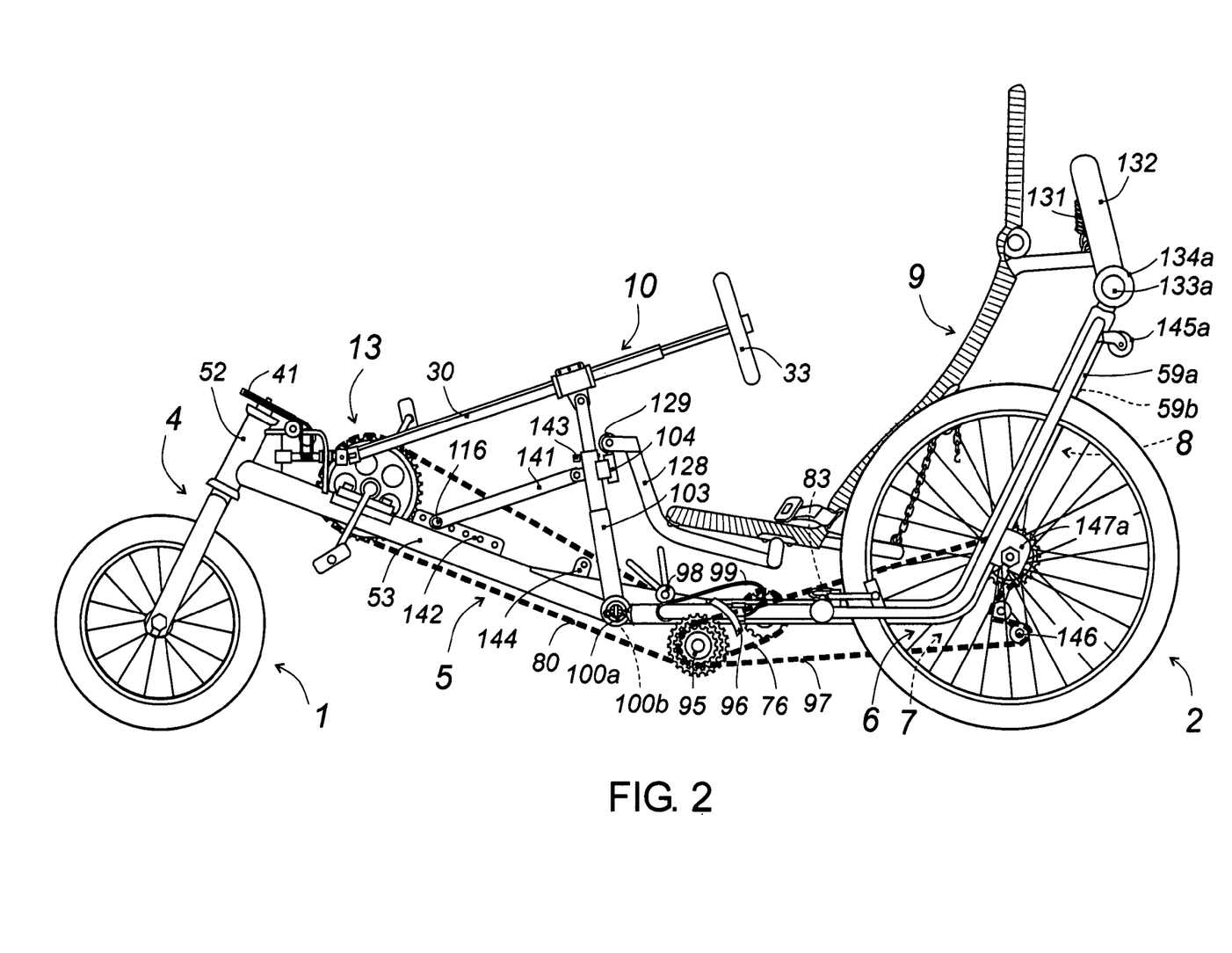
FIG. 2 is a side view of the vehicle shown in FIG. 1.
Figures 3, 21:
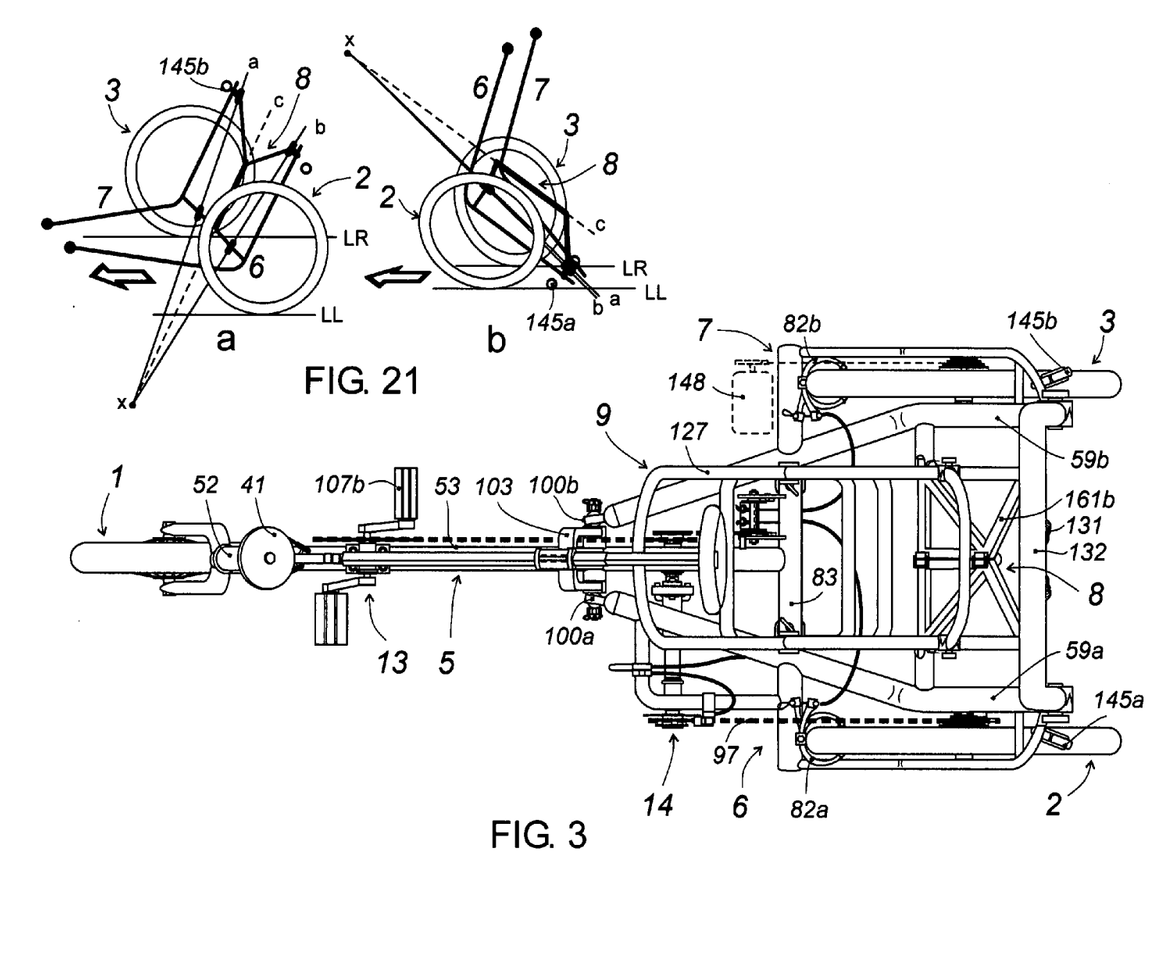
FIG. 3 is a top view of the vehicle with the seat bag and belt removed to show details.
FIG. 21 is a simplified isometric view of the left and right frames in driving (a) and folded (b) positions, illustrating the function of the folding brace.

As shown in FIGS. 2 and 3 the frame of the vehicle is comprised of a main frame element 5 and left and right frame elements 6, 7, connected pivotally to the main frame element by the ball joints 100a and 100b. The frame is constructed from bent and welded thin-wall steel or aluminum tubing. The main frame element 5 consists of a fork tube 52, two welded and reinforced parts of longitudinal tube 53 and cross-tube 83. As is better seen in FIG. 10, the frame element 5 holds a cable reducer support 45, crank assembly base 110, holed bar 142, short holed bar 144 and a pivot base 120. The bottom side the frame holds the body of a bearings bracket 78, the end of the frame holds brackets 61 and 75 of the braking mechanism and a cable support bracket 73. The cross-tube 83 has two eyebolt connection devices. They provide a rigid connection of the ends of the cross-tube 83 to the left and right frame elements 6 and 7. As shown on the cross-section FIG. 12, the eyebolt 70a is affixed inside the tube by a spring, washer and pin 84 and can be screwed into the welded nut 86 to fasten washer 85 to the seat 71a.

Figure 4:
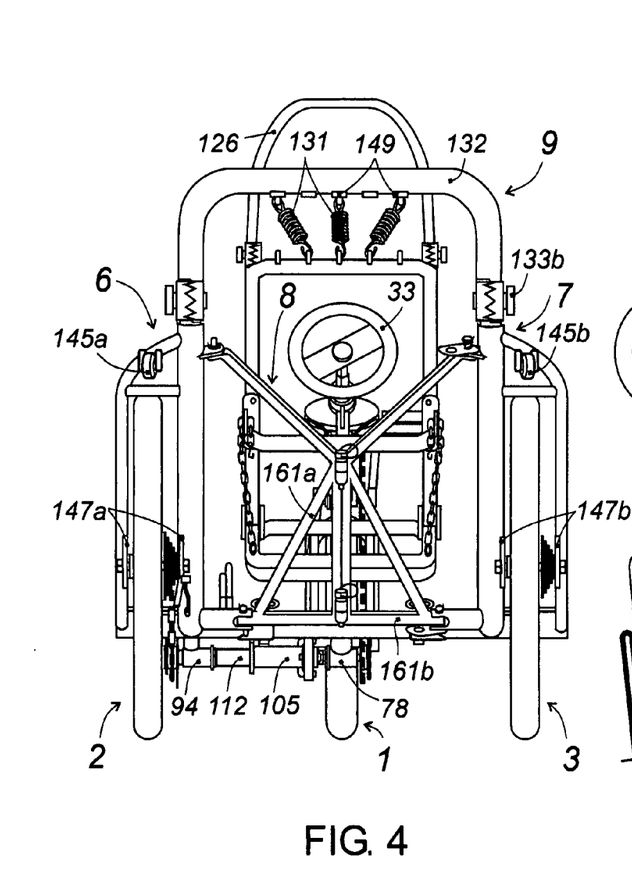
FIG. 4 is a rear view of the vehicle with the seat bag and belt removed to show details.
Figures 10, 11, 12:
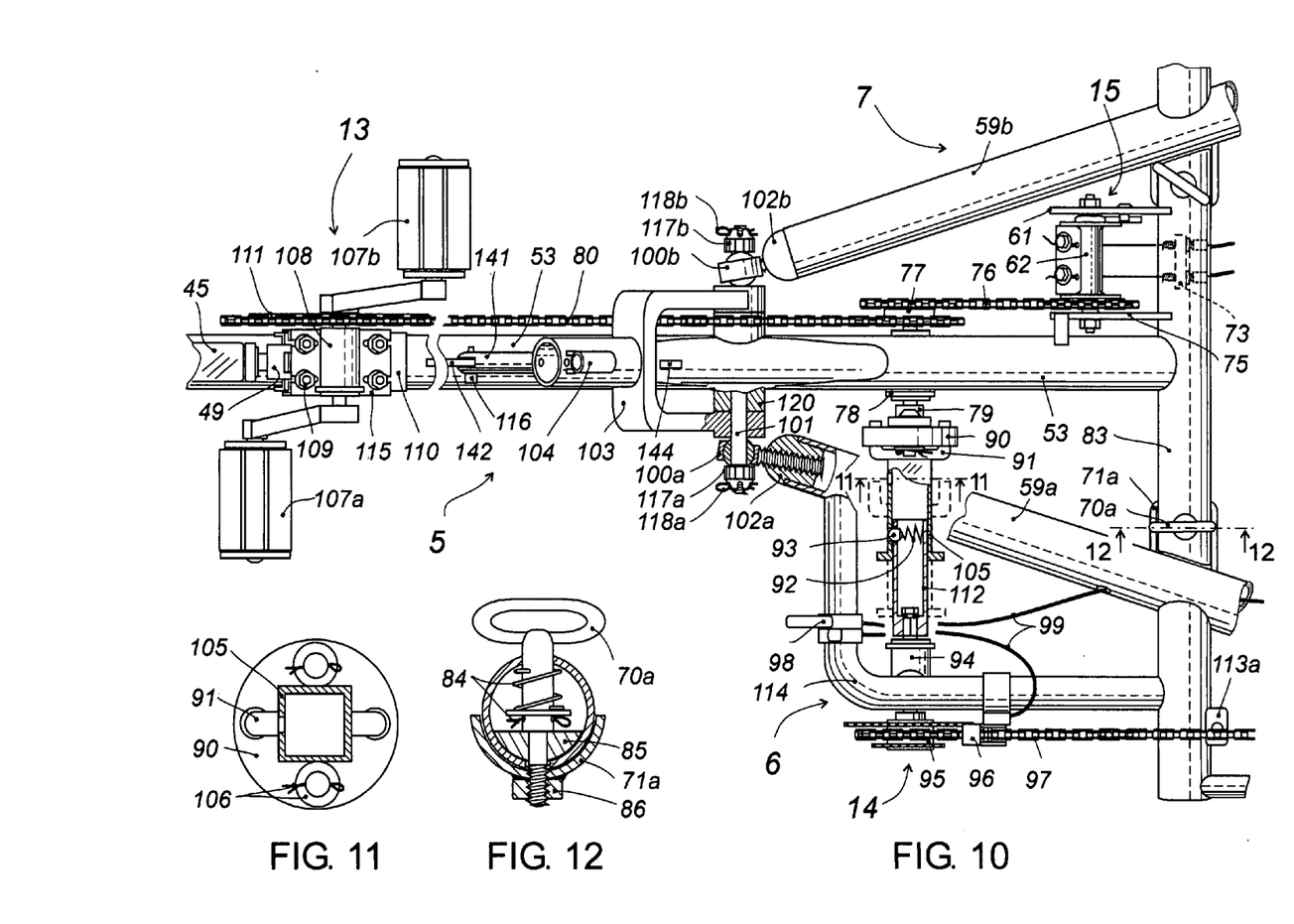
FIG. 10 is a top view of the middle part of the vehicle with partially cross-sectional views and with the seat and steering shaft removed to show details.
FIG. 11 is a cross-sectional enlarged view taken substantially along the line 11-11 shown in FIG. 10
FIG. 12 is a cross-sectional enlarged view taken substantially along the line 12-12 shown in FIG. 10

As further shown in FIG. 10, the front ends of the left and right frame elements 6 and 7 have spherical joints 100a and 100b. They are screwed to plugs 102a and 102b and are connected to the main frame element by a pivot bolt 101. Round head crown nuts 117a, 117b and pins 118a, 118b are attached to the joints 100a, 100b and can be removed by hand for disassembling the frame before transportation of the cycle. Further back, each of the frame elements have brake brackets 113a (FIGS. 10) and 113b (FIG. 13) and two wheel brackets 147a, 147b (FIG. 4). The swivel casters 145a, 145b, as seen in FIG. 4, support the folded vehicle in an upright position. Additionally, the left frame element 6 (FIG. 10) has a bracket tube 114, which is used to hold a bearings bracket 94, front derailleur 96 and shifters 98. In driving position, as seen in FIG. 4, the top ends of the left and right frame elements 6, 7 are connected by a cross element 132; back parts—by a folding brace 8.

Folding brace assembly 8 (better seen in FIG. 4) holds the left and right frame elements 6 and 7 in the right related positions when the vehicle is open and folded as well. FIG. 21 illustrates the function of the folding brace. In open position (FIG. 21a) it provides a rigid connection to frame elements 6 and 7 and allows for rotation of the wheels 2 and 3 in parallel planes. In the vehicle's folded vertical position (like illustrated in FIG. 21b), the planes of the wheels are non-parallel, but to provide easy moving of the folded cycle, the lines of intersection of the planes of the wheels with the plane of the road (lines LL and LR) are parallel. An axes of folding (x-a), (x-b) and (x-c) are coming to one point (x).

Figure 17:
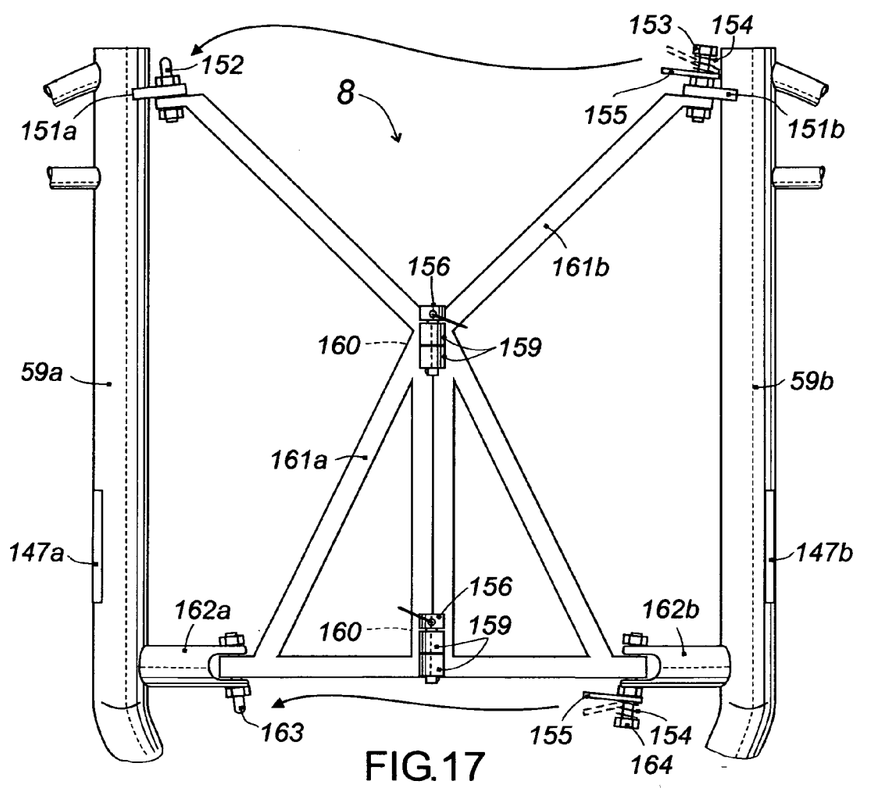
FIG. 17 is a back view of the folding brace assembly (view is perpendicular to the plane of the brace).
Figure 18:
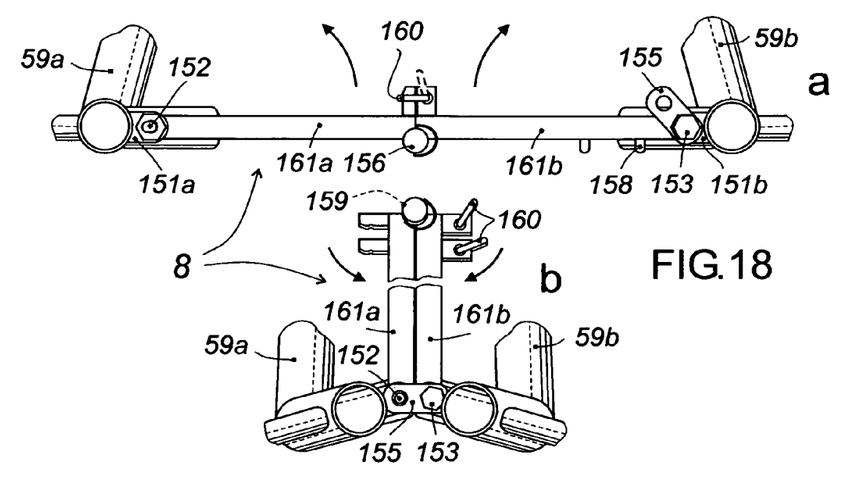
FIG. 18 is a top view of the folding brace assembly in open (a) and folded (b) positions (view is along the plane of the brace).

As best seen in FIG. 17 and FIG. 18, the folding brace 8 is comprised of two parts 161a and 161b, pivotally connected to each other by the top and bottom hinges 159 with removable pins 156. Parts 161a, 161b also connected to main tubes 59a, 59b by top brackets 151a, 151b, with bolts 152, 153 and bottom brackets 162a, 162b (FIG. 17) with bolts 163, 164. Additionally, bolts 153 and 164 hold latches 155 with springs 154. In the open position (FIG. 18a), the parts of the folding brace 161a, 161b are attached by a clamps 160. In the folded position (FIG. 18b), the parts are attached by the top and bottom latches 155. The ends of the latches can be lifted and hooked onto the pin-ends of the bolts 152, 163, as shows by arrows in FIG. 17. For disassembling the vehicle, pins 156 can be removed.

Figure 15:
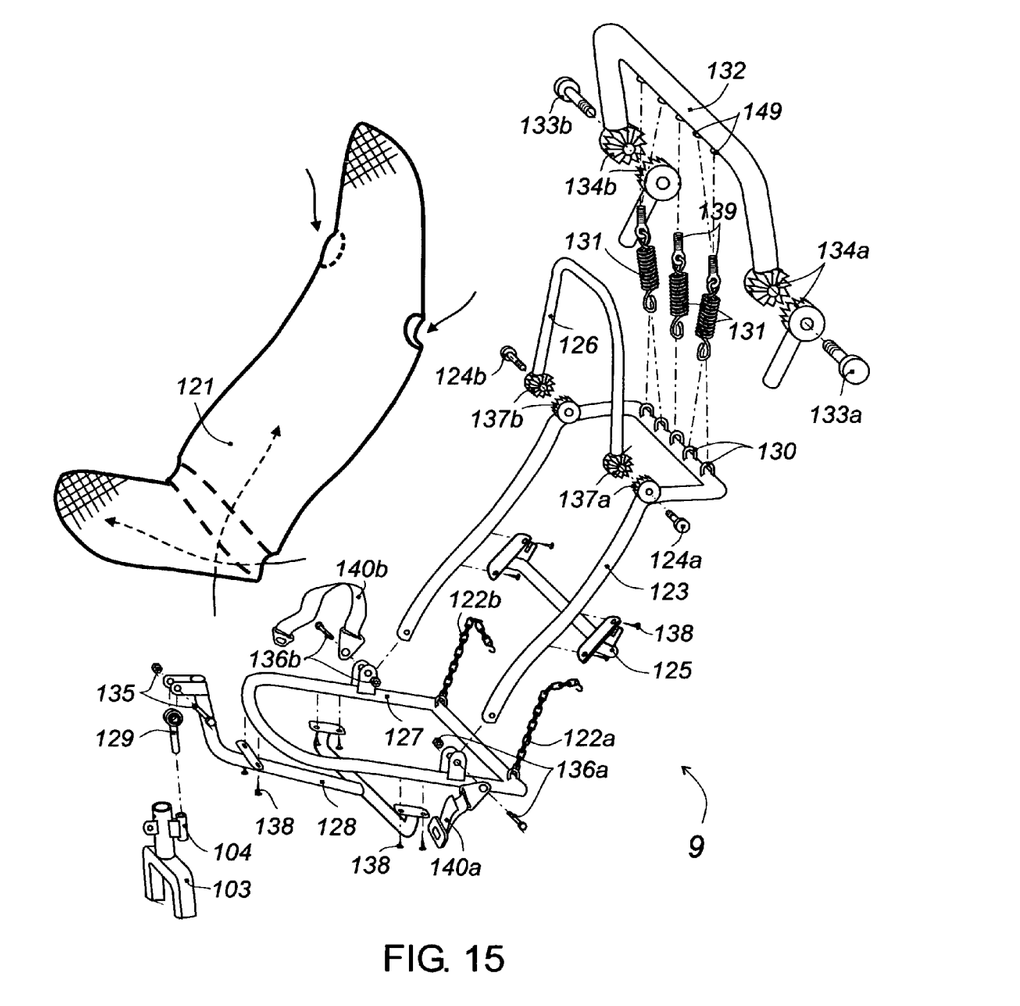
FIG. 15 is an exploded view of the seat assembly.

According with another aspect of the invention, the recumbent vehicle has a removable folding seat with two-point spring suspension. The seat assembly 9, as shown in FIG. 15, is comprised of a frame, covered by a fabric bag 121. The frame has a bottom part 127 with a T-brace 128, back part 123 with a brace 125 and a head part 126. The part 127 is pivotally connected to the part 123 by bolts and nuts 136a, 136b. The angle between these parts can be adjusted by changing of the length of chains 122a, 122b, fixed in the slots of the brace 125. The angle between the parts 123 and 126 is also adjustable by changing the position of the tooth couplings 137a, 137b, tightened by the bolts 124a, 124b. The T-brace 128 and the brace 125 are attached to the covered frame by the screws 138. The seat has a safety belt 140a, 140b.

The seat has two points of suspension—on the front end of the frame and on the back. The front support of the seat has a spherical joint 129, connected to the T-brace 128 with bolt and nut 135. The end of the joint is inserted into the bracket collar 104 of the fork support 103. The back end of the seat is suspended from the cross element 132 by the buffer springs 131. The bottom ends of the springs 131 are connected to the eyes 130, top ends—to the threaded eye bolts 139. These bolts are screwed to the nuts 149, welded to the bottom of the cross element 132. The parameters of the springs and their quantity can be chosen according to the weight of a driver. To allow changing of motion and leaning of the seat for various conditions, the ends of each spring can be connected to different eyes and nuts, as shown in FIG. 15 by the dotted lines. To adjust the distance between the seat and the pedals, the seat can be shifted in a back-forward direction by a simultaneous adjustment of the inclination of the cross element 132 and the fork support 103. For adjustment, the cross element 132 has tooth couplings 134a, 134b, tightened with bolts 133a, 133b. The ends of the tooth couplings are inserted into the top ends of the main tubes 59a, 59b of the rear frames 6, 7 (FIG. 2), and can be taken out. The fork support 103 (FIGS. 2, 10) has a brace 141, and its bottom end can be affixed by pin 116 to the holed bar 142. The short holed bar 144 is used to fix the brace 141 in the folded position of the fork support 103.

Figure 19:
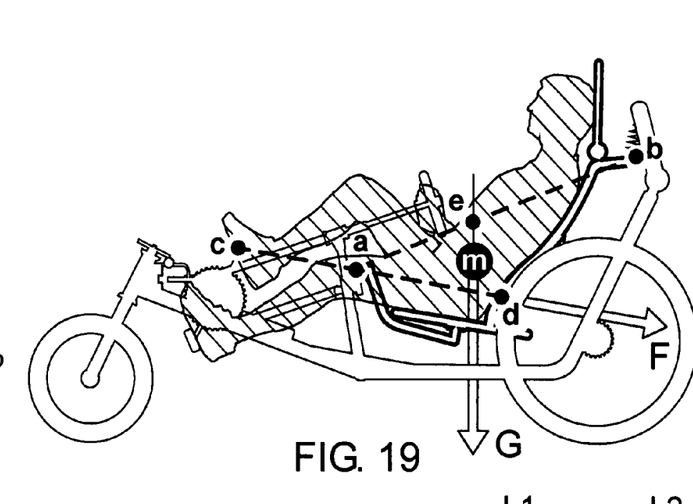
FIG. 19 is a schematic side view of the recumbent vehicle, illustrating the forces applied to the seat.
Figure 20:
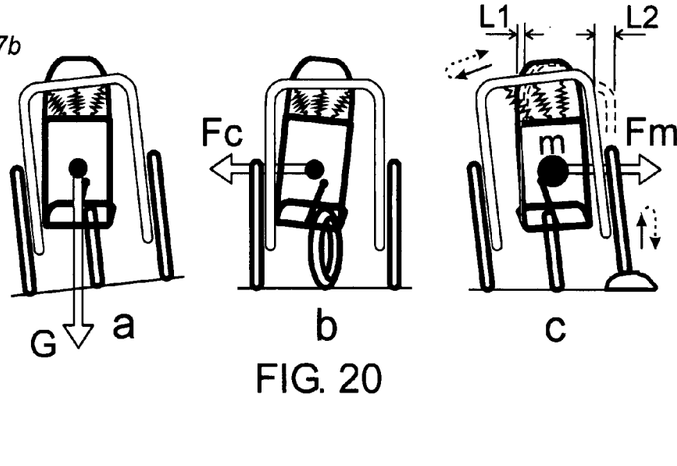
FIG. 20 is a schematic rear view of the vehicle, illustrating the inclination of the seat during a lateral slope driving (a), right turn driving (b), and driving through an obstacle (c).

The suspension of the seat allows leaning of the driver's body according to the forces applied. FIG. 19, and FIG. 20 illustrate the principle of function of the leaning system. According to FIG. 19, the spherical joint (a), and the bottom ends of the springs (b), are raised in such a way that the center of suspended mass (m), (the mass of the seat and of the seated driver, excluding the part of the legs which rest on the pedals) is lower than a suspension line (a-b)—i.e. point (m) in the drawing is lower than the point (e). In the meantime, in order to minimize the influence of the pushing force (F) to the seat, the point (a) lays close to the vector line (c-d) of the force (F). The force of gravity (G) keeps the seat with the driver in vertical position when the vehicle drives on a lateral slope, as shown in FIG. 20a. When turning, the centrifugal force (Fc) allows leaning of the seat with the driver proportional to this force, as illustrated in FIG. 20b (shown is a right side turn). Furthermore, the long buffer springs allow dampening not only straight up road shocks, but also side loading forces, especially those applied to the top part of the driver's body and head, when the wheel on one side runs over an obstacle and the vehicle leans sharply, as shown in FIG. 20c. In this case, the inertia of the mass (Fm) keeps the driver's body from moving rapidly and shifting of the top part of the seat (L1) is relatively less than the shifting of the relevant top part of the vehicle frame (L2).

Figures 13, 14:
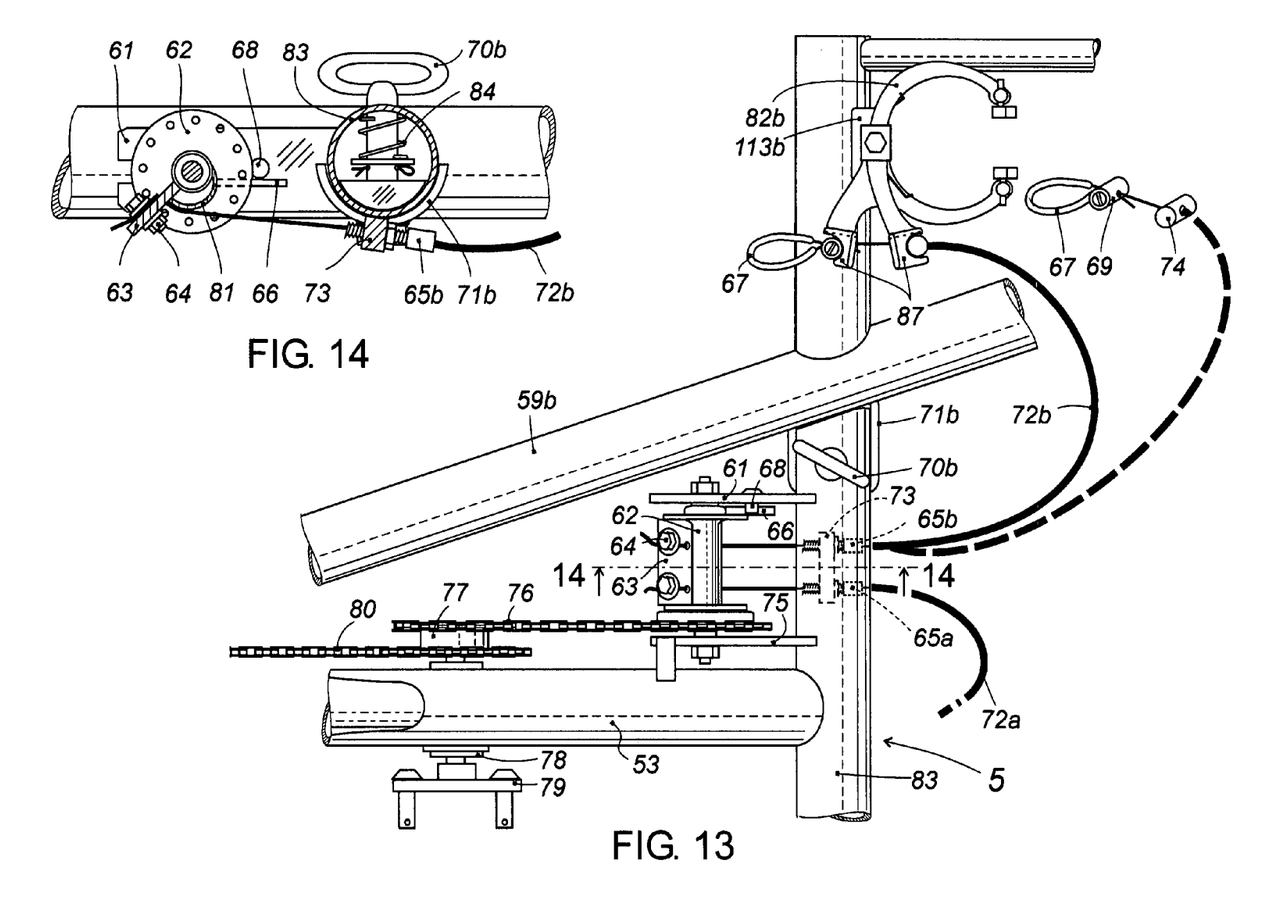
FIG. 13 is a top view of the brake mechanism.
FIG. 14 is a cross-sectional enlarged view taken substantially along the line 14-14 shown in FIG. 13.

According with another aspect of the invention, the recumbent cycle has a back-pedaling braking mechanism comprised of a chain drive, braking drum assembly, cables and calipers. As shown in FIG. 13, the rotation from the pedals through the double sprocket 77 and chain 76 is transmitting to the braking drum assembly 62, which is a modified freewheel and hub assembly like that a conventional bicycle. The tension of the chain 76 can be adjusted by shifting the drum assembly in slotted-brackets 61 and 75. Support 66 and pin 68 prevent the forward rotation of the drum 62. The ends of cables 72a, 72b are affixed to a plate 63 by bolts with nuts 64; the cable shields are affixed in bracket 73 with the adjusting screws 65a, 65b. The other ends of the cables 72a, 72b are connected to the calipers of the rear wheels (shown only right one 82b). Back rotation of the pedals engages the ratchet mechanism of the drum assembly 62. The drum starts to turn and pulls the braking cables 72a, 72b, which squeeze the calipers and stop the wheels. The eccentric half-cylinder 81 (better seen in FIG. 14) provides a more efficient process of braking. For folding the vehicle, the cables should be disconnected from the calipers. For this purpose the ends of the caliper levers have grooved ends 87 (see FIG. 13), and each cable has a terminator 69 and shield terminator 74. The cable can be connected or disconnected by a finger hooked into the loop 67 with a slight squeezing of the caliper. Instead of calipers, other types of bicycle brakes may be used. The mechanism can include a third cable and brake for the front wheel.

Figures 8, 9:
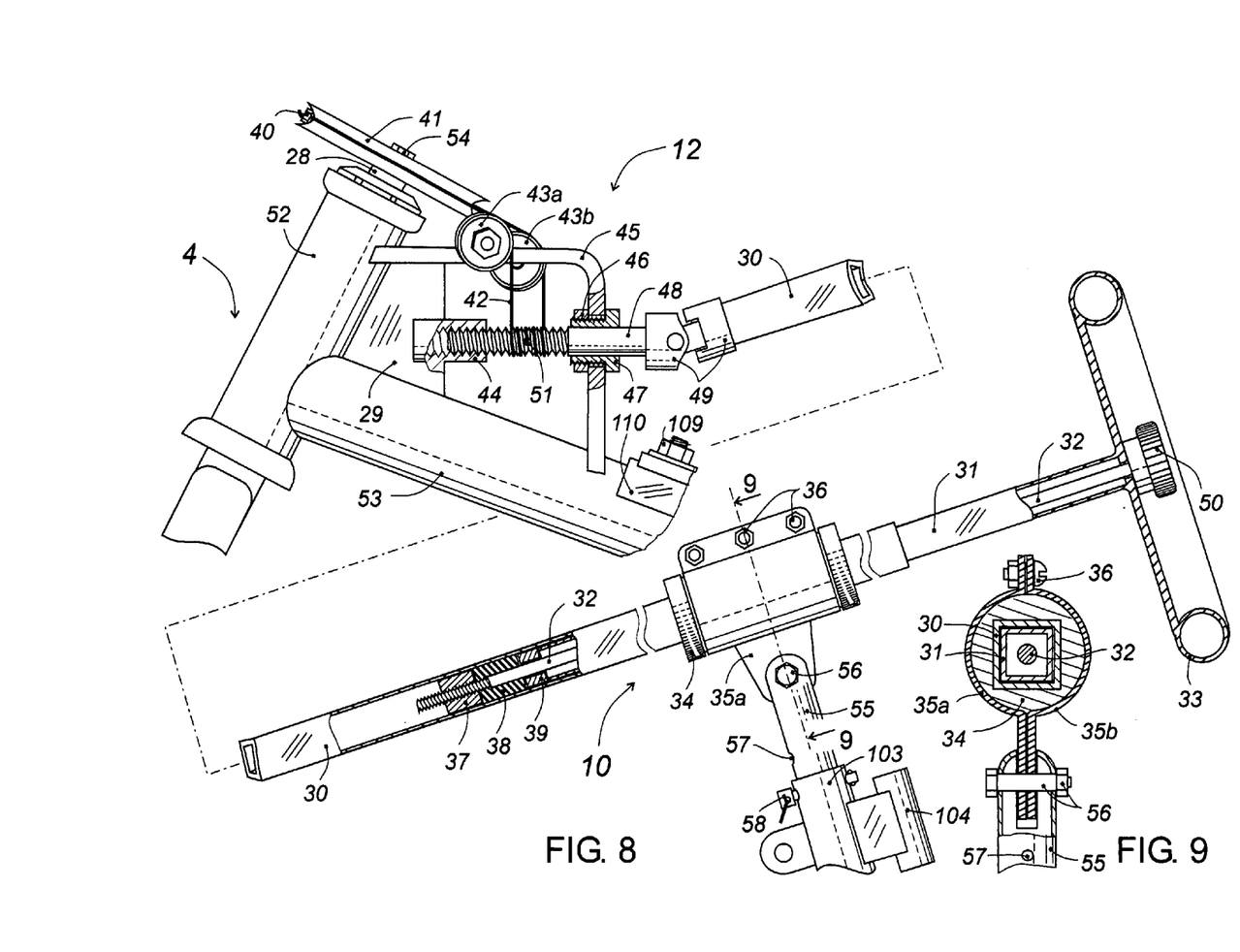
FIG. 8 is a side view of the steering mechanism with partial cross-sectional views.
FIG. 9 is an enlarged cross-sectional view taken substantially along the line 9-9 shown in FIG. 8.

According with another aspect of the invention, the vehicle has a car-style steering mechanism, shown in details in FIG. 8. It has a steering shaft assembly 10, cable reducer 12 and a front fork assembly 4. The inner square tube 31, with the steering wheel 33 on the end, is telescopically inserted into the outer square tube 30 and, after a length adjustment, can be affixed inside. Turning of the head 50 with stem rod 32 allows movement of the square nut 37 towards the support collar 39 and squeezing of the rubber plug 38, which expands and tightens to the outer tube 30. In the middle the steering shaft has a support, comprised of a plastic bushing 34, shown also in cross-sectional enlarged view FIG. 9, which can slide along the tube 30 and turn together with the steering shaft inside semi-collars 35a, 35b. The collar parts are attached together by bolts and nuts 36; the bottom ends are connected through the bolt and nut 56 to the tube 55. This tube is telescopically inserted into the fork support 103 (FIG. 8) and by means of the holes 57 and pin 58 the height of the steering wheel can be adjusted.

The turning of the steering wheel 33 with shaft 10 transmits to the universal joint 49, and further, to the cable reducer 12. The driving shaft 48 of the cable reducer rotates inside the bushing 47, which is attached by a nut 46 to a support 45. The front end of the shaft is threaded in order to guide the winding of cable 42 and, at the same time, to move the shaft lengthwise inside the base nut 44, keeping the tension of the cable stable. The middle of the cable is fixed inside hole 51 of the shaft; two ends of cable are attached to the front of the driven pulley 41 by a screw 40. Two idle pulleys 43a, 43b direct the movement of the cable 42. Plate 29 holds a nut 44 and enforces the connection between fork tube 52 and longitudinal tube 53. The front fork assembly 4 is comprised of the same parts as the fork of a conventional bike. The inner tube 28 with the driven pulley 41 is attached to the fork by a stem bolt 54.

The folding recumbent vehicle has a main two-stage chain drive, which transmits the rotation from pedals to the left rear wheel. The main drive is comprised of a pedal crank assembly, first stage chain drive, intermediate shaft assembly and a second stage chain drive. The pedal crank assembly 13, as it is seen in FIG. 10, is comprised of pedals 107a, 107b, a chain wheel 111 and a bearing bracket assembly 108, mounted on a shifting plate 115. The plate is attached to a base 110 with four nuts and washers 109. It can be adjusted according to the length of the chain 80. The rotation from the chain wheel 111 transmits through the chain 80 to a double sprocket 77. Further, the rotation transmits in two directions: one—to a chain 76 and the braking mechanism, another—to the intermediate shaft assembly 14. The intermediate shaft assembly has two parts rotatably mounted to the different elements of the frame: main frame 5 and left frame 6. These parts can be disengaged before folding the frame of the vehicle. The first part includes a bearing bracket assembly 78, driving fork 79, and a rubber disk 90, attached to the fork with two pins with washers 106 (see FIG. 11). The second part of the intermediate shaft is comprised of two telescoping square tubes 105, 112 (see FIG. 10) and a bearing bracket assembly 94 with a sprocket cassette 95. The square tube 105 slides back on the inner tube 112 and disengages the driven fork 91 from holes in the rubber disk 90. A ball 93 and spring 92 fix the tube 105 in the engaged or disengaged (shown by dashed lines) positions. A chain 97 transmits rotation from the cassette 95 to the gear cassette of the left rear wheel 2 (FIG. 2). Two conventional derailleurs, 96 and 146, moved by the shifters 98 and cables 99, allow the rider to select the gear within a wide range. The right rear wheel can additionally be driven by a portable electric motor 148 (see FIG. 3).

Figure 5:
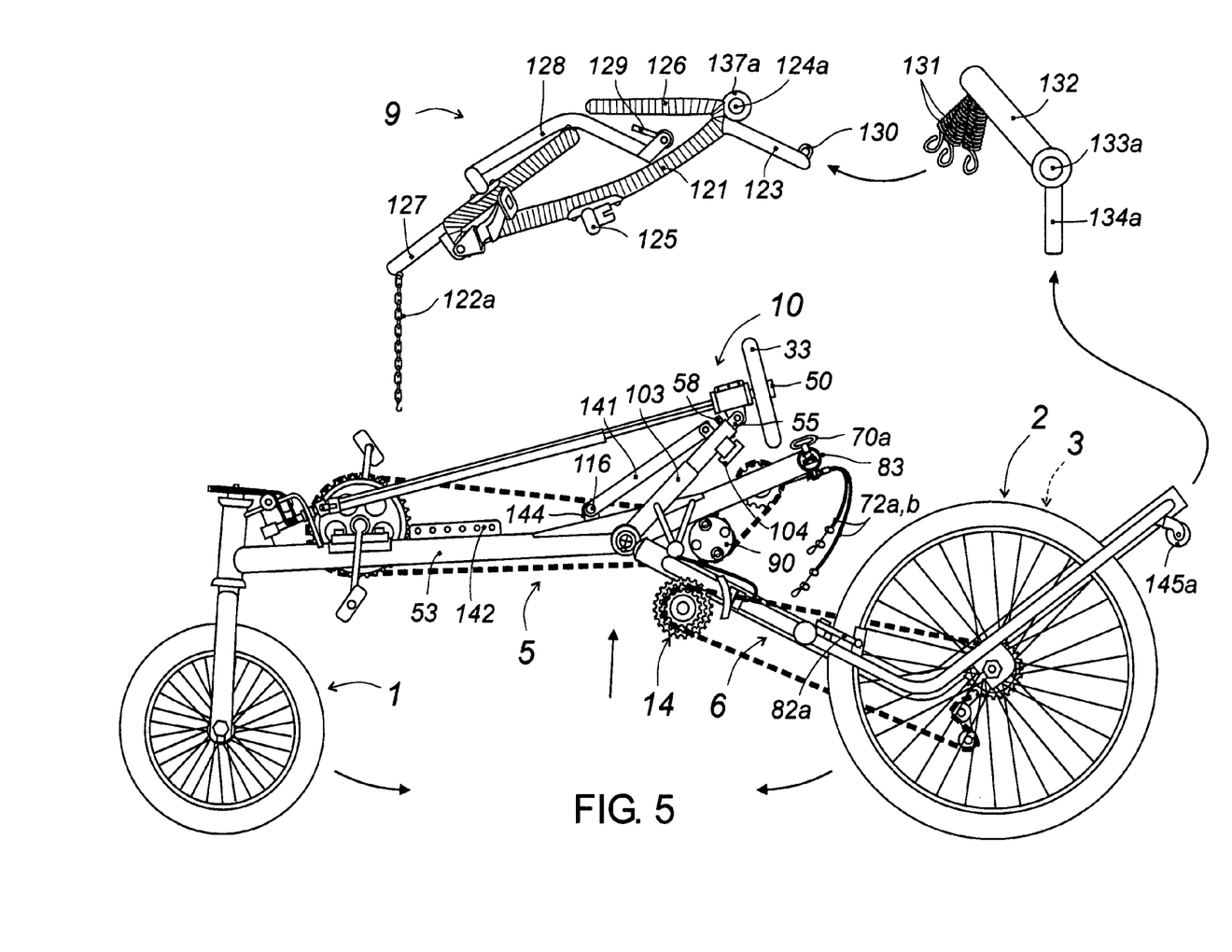
FIG. 5 is a side view of the vehicle with the frame being placed towards its folded position with the removed and folded seat, disconnected cross element, and lowered steering shaft.
Figure 6:
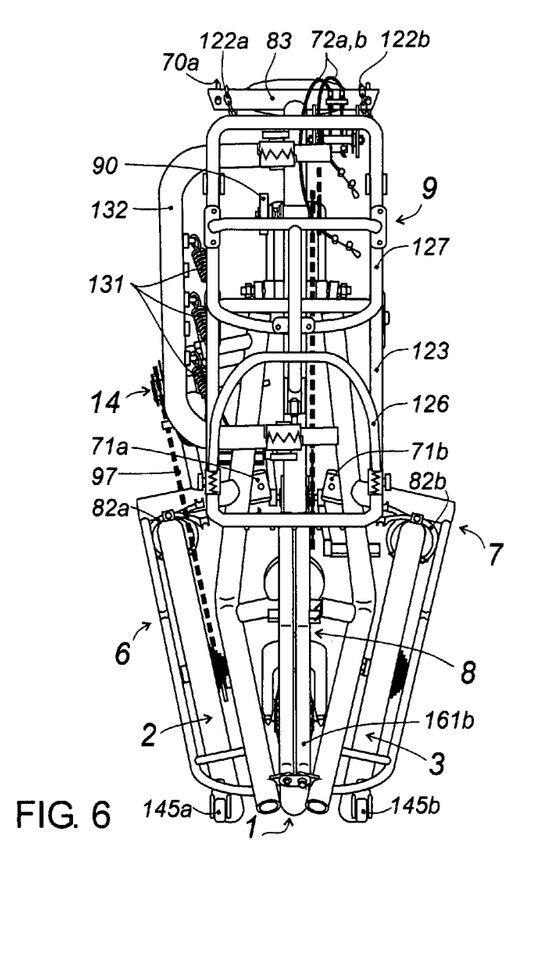
FIG. 6 is a front view of the vehicle in its folded position, standing upright with the seat bag and belt removed to show details.
Figure 7:
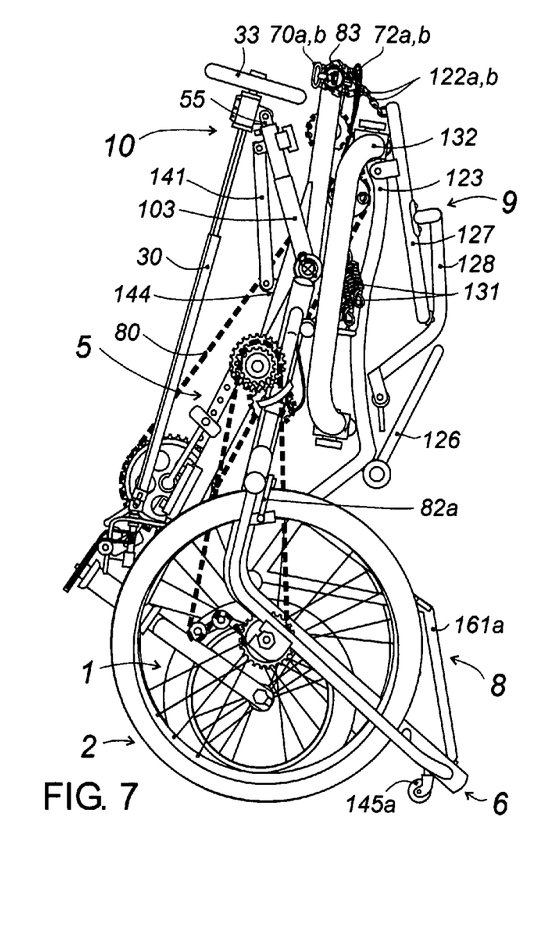
FIG. 7 is a side view of the vehicle, in its folded position, standing upright with seat bag and belt removed to show details.

FIG. 5 illustrates the middle stage of the folding of the recumbent vehicle. FIG. 6 and FIG. 7 are the front and side views of the vehicle in its folded position, standing upright with the seat bag removed to show details.

The sequence for folding is:
1. Take out the seat assembly 9 with cross element 132 and springs 131.
2. Disconnect the springs 131 and separate the cross element 132 from the seat 9.
3. Fold the seat 9. Fold the bottom 127, back 123, and head 126 parts of the seat frame.
4. Lower down the steering shaft 10. Set the lowest position of the tube 55. Connect the end of the brace 141 to the bar 144.
5. Disengage the intermediate shaft assembly 14.
6. Disconnect braking cables 72a, 72b from the calipers 82a, 82b.
7. Release the ends of the cross-tube 83 from the rear frames 6 and 7. Unscrew the eyebolts 70a, 70b from the seats 71a and 71b.
8. Fold the frame. Release the staples 160. Lift up the back end of the main frame 5, move the front wheel 1 between the rear wheels 2 and 3, stand the left and right frames 6, 7 on the wheels 2, 3 and caster wheels 145a, 145b.
9. Fold the folding brace 8, close the left 6 and right 7 frame elements, lock it using latches 155.
10. Hang the seat. Using the chains 122a, 122b hang up the folded seat 9 on the cross-tube 83. The cross element 132 should be hanged behind the seat.

The recumbent vehicle is folded and ready to move on its wheels to a storage place. It can be covered by a special protective cover.

To assemble the tricycle back into the driving position—follow the sequence backwards.

Figure 16:
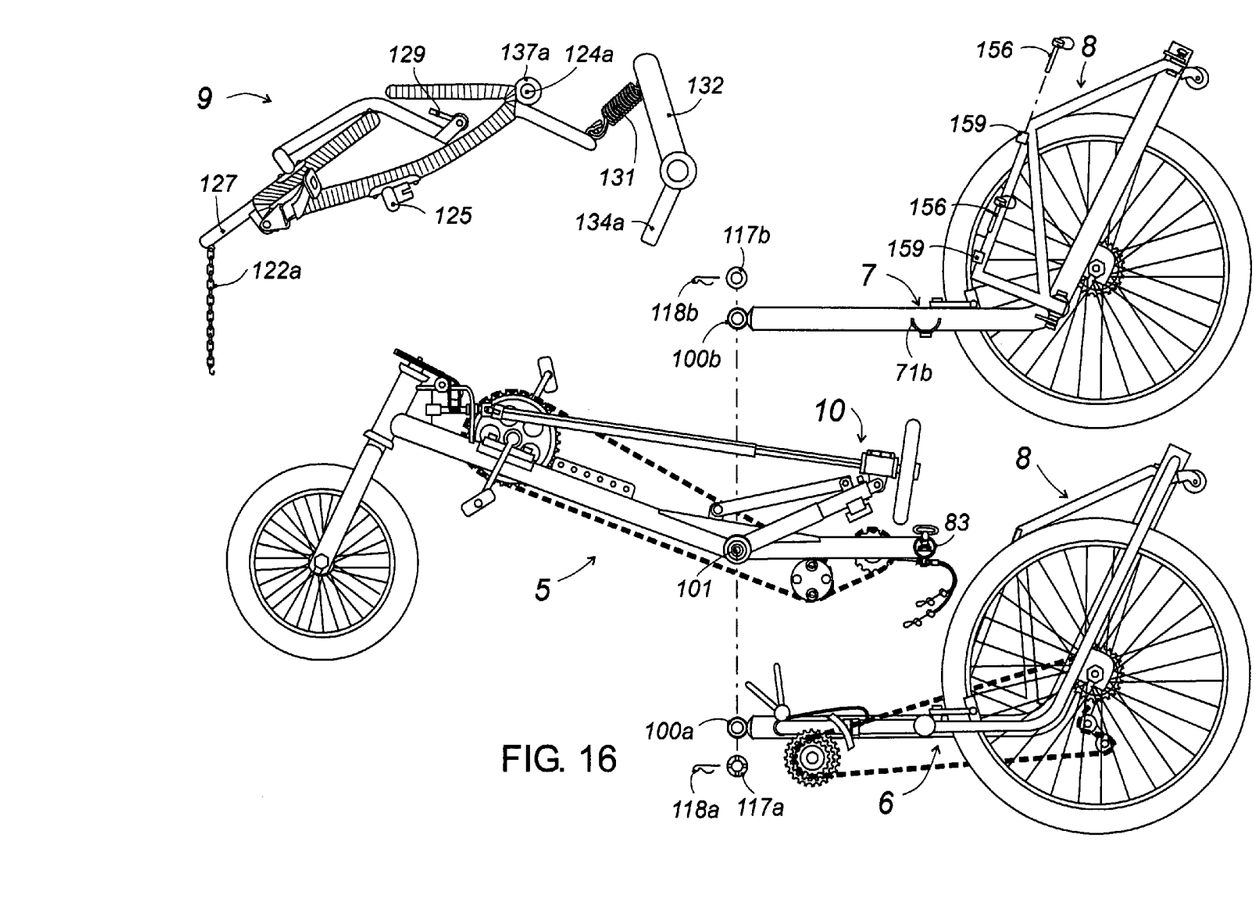
FIG. 16 is a side view of the vehicle disassembled to four parts with the folded seat and lowered steering mechanism.

FIG. 16 illustrates the disassembling of the cycle for carrying inside a car. The first six steps are similar with the process of folding, described above.
1. Take out the seat assembly 9 with the back cross-tube assembly.
2. Fold the seat.
3. Lower down the steering shaft.
4. Disengage the intermediate shaft.
5. Disconnect cables from calipers.
6. Release the ends of the cross-tube 83 from the rear frames 6 and 7.
7. Disconnect the folding brace 8, release the clamps 160 and take out the pins 156.
8. Disconnect the frames 6, 7 from the main frame element 5. Take out the pins 118a, 118b, unscrew the crown nuts 117a, 117b and pull the spherical joints 100a, 100b out of the ends of the pivot bolt 101.

The recumbent vehicle is disassembled to four parts and ready for transportation inside a car.

What is claimed is:

1. A recumbent vehicle comprising:
   a frame;
   at least one steered wheel rotatably mounted to the frame for turning the vehicle;
   at least one driving wheel rotatably mounted to the frame for propelling the vehicle;
   a leg operated pedal mechanism operatively coupled to the driving wheel for rotating the driving wheel to propel the vehicle; and
   a seat suspended from the frame,
   wherein said seat has at least two points of suspension and wherein a line connecting said points is placed higher than center of gravity of the seating driver such that the gravity force keeps the seat with the driver in vertical position and the centrifugal force leans the seat with the driver left or right.

2. The recumbent vehicle of claim 1 wherein the seat has a forward point and a rearward point of suspension, said forward point being mounted to the frame by a pivoting joint, said rearward point being suspended from the frame by at least one spring.

3. The recumbent vehicle of claim 2 wherein the pivoting joint pivots in several directions.

4. The recumbent vehicle of claim 1 wherein the seat is detachable from the frame.

5. The recumbent vehicle of claim 1 wherein the pedal mechanism further comprising an intermediate shaft being rotatably mounted to the frame, said intermediate shaft having a first portion and a second portion and wherein said first and second portions are coupled such that said portions can be engaged or disengaged.

6. The recumbent vehicle of claim 1 wherein the frame further comprises a main frame element and a right and left frame elements and wherein said right and left frame elements each being mounted to said main frame element by a movable connector configured to permit the right and left frame elements to move relative to the main frame element such that the vehicle may be moved between an extended position wherein the right and left frame elements are extended away from the main frame element and a folded position wherein the right and left frame elements are folded adjacent to the main frame element.

7. The recumbent vehicle of claim 6 wherein the right and left frame elements are detachable from the main frame element.

8. The recumbent vehicle of claim 6 wherein the movable connectors are capable of pivotal movement in several directions.

9. The recumbent vehicle of claim 6 further comprises a right and left driving wheels and wherein said right driving wheel being rotatably mounted to the right frame element and said left driving wheel being rotatably mounted to the left frame element.

10. The recumbent vehicle of claim 9 further comprising a left caster wheel mounted to the left frame element and a right caster wheel mounted to the right frame element and wherein the left and right frame elements being dimensioned and configured such that the folded vehicle can be positioned vertically with balanced support provided by the left and right driving wheels and said left and right caster wheels, and the vehicle can be moved on these wheels.

11. The recumbent vehicle of claim 9 further comprising a folding brace having a left portion being pivotally mounted to the left frame element and a right portion being pivotally mounted to the right frame element and said left and right portions being pivotally connected to each other such that said folding brace can be moved between an opened and folded positions and wherein said folding brace being dimensioned and configured such that: in extended position of the vehicle and opened position of the folding brace the planes of the left and right driving wheels are parallel; in folded position of the vehicle, when the vehicle positioned vertically, and folded position of the folding brace the line of crossing the plane of the left driving wheel with the plane of the road is parallel to the line of crossing the plane of the right driving wheel with the plane of the road.

12. The recumbent vehicle of claim 1 further comprising a brake mechanism operatively coupled to the pedal mechanism and operatively coupled to at least one wheel for stopping the vehicle by stopping the rotation of the wheel when said brake mechanism is engaged.

13. The recumbent vehicle of claim 12 wherein the brake mechanism further comprises a brake drum assembly being operatively coupled to the pedal mechanism, at least one brake being coupled to the wheel and at least one cable, said cable is connected to said brake drum assembly and to said brake and wherein said brake drum assembly being configured such that pedaling the pedal mechanism in a reverse direction causes the brake drum assembly to pull the cable and thereby to engage said brake.

14. The recumbent vehicle of claim 13 wherein the brake drum assembly further comprises a freewheel being operatively coupled to the pedal mechanism.

15. The recumbent vehicle of claim 1 further comprising a steering mechanism operatively coupled to the steered wheel for turning the steered wheel for turning the vehicle, said steering mechanism further comprises a fork assembly which is in turn rotatably mounted to the frame and which holds the steered wheel; a cable reducer mounted to the frame and operatively coupled to said fork assembly; a hand-operated steering wheel operatively coupled to said cable reducer and wherein said steering mechanism configured such that turning the steering wheel clockwise causes the vehicle to be steered towards the right and turning the steering wheel counter-clockwise causes the vehicle to be steered towards the left.

16. The recumbent vehicle of claim 15 wherein the cable reducer further comprises a driving shaft operatively coupled to the steering wheel, a driven pulley mounted to the fork assembly and a cable, said cable being wound around said driving shaft and around said driven pulley and said cable being guided by a plurality of idle pulleys.

17. The recumbent vehicle of claim 16 wherein the driving shaft has a thread and wherein the driving shaft is rotatably screwed into the frame and said thread is guiding of winding the cable such that the tension of the cable is constant within the full range of turning of the fork assembly.

* * * * *